(12) United States Patent
Isakiewitsch et al.

(10) Patent No.: US 9,434,416 B2
(45) Date of Patent: Sep. 6, 2016

(54) SUBFRAME FOR A MOTOR VEHICLE

(71) Applicant: AUDI AG, Ingolstadt (DE)

(72) Inventors: Christian Isakiewitsch, Ingolstadt (DE); Sebastian Scheiblecker, Pförring (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/510,676

(22) Filed: Oct. 9, 2014

(65) Prior Publication Data

US 2015/0102576 A1  Apr. 16, 2015

(30) Foreign Application Priority Data

Oct. 10, 2013  (DE) .................. 10 2013 016 758

(51) Int. Cl.
 *B62D 21/11*   (2006.01)
 *B60K 5/12*    (2006.01)

(52) U.S. Cl.
 CPC ............. *B62D 21/11* (2013.01); *B60K 5/12* (2013.01); *B60K 5/1283* (2013.01)

(58) Field of Classification Search
 CPC  B62D 21/11; B62D 21/155; B60G 2204/15; B60K 5/12; B60K 5/1283
 See application file for complete search history.

(56) References Cited

U.S. PATENT DOCUMENTS

2014/0145423 A1* 5/2014 Isakiewitsch ......... B62D 21/11
                                                        280/781

FOREIGN PATENT DOCUMENTS

| CN | 2820652 Y | 9/2006 |
|---|---|---|
| CN | 102574547 A | 7/2012 |
| DE | 198 22 731 | 11/1999 |
| DE | 102006013547 | 9/2007 |
| DE | 102008010553 | 8/2009 |
| EP | 1591348 | 11/2005 |
| EP | 1837268 | 9/2007 |
| GB | 2457591 | 8/2008 |

OTHER PUBLICATIONS

Chinese Search Report issued by the Chinese Patent Office in Chinese Patent Application No. 2014105328489 on May 18, 2016.
English translation of Chinese Search Report issued by the Chinese Patent Office in Chinese Patent Application No. 2014105328489 on May 18, 2016.

* cited by examiner

*Primary Examiner* — Ruth Ilan
(74) *Attorney, Agent, or Firm* — Henry M. Feiereisen LLC

(57) ABSTRACT

A subframe for a motor vehicle includes at least one transverse structure oriented in a transverse direction of the vehicle, a first and a second longitudinal member oriented in a longitudinal direction of the vehicle and connected to the at least one transverse structure by respective first and second cast joints respectively arranged between the first longitudinal member and the at least one transverse structure and the second longitudinal member and the at least one transverse structure, the first and second cast joints each having bearing connection points for fastening an engine bearing. The subframe also includes connection parts, one of which is provided for each of the first and second cast joints, the connection parts each having at least one other bearing connection point for fastening the engine bearing, and multiple bearing sites via which the connection parts are fastenable on the at least one transverse structure and on the bearing connection points of the first and second cast joints.

5 Claims, 3 Drawing Sheets

SUBFRAME FOR A MOTOR VEHICLE

CROSS-REFERENCES TO RELATED APPLICATIONS

This application claims the priority of German Patent Application, Serial No. 10 2013 016 758.2, filed Oct. 10, 2013, pursuant to 35 U.S.C. 119(a)-(d), the disclosure of which is incorporated herein by reference.

BACKGROUND OF THE INVENTION

The present invention relates to a subframe for a motor vehicle.

The following discussion of related art is provided to assist the reader in understanding the advantages of the invention, and is not to be construed as an admission that this related art is prior art to this invention.

Subframes for motor vehicles known in the art are usually formed by two spaced-apart cast joints, which are interconnected by means of a transverse member and/or a stiffening element. The subframe also includes longitudinal members, which are connected with both the cast joints and with the vehicle body. The cast joints or the longitudinal members have corresponding connection points for the arrangement of control arms. For the reception/fastening of drive aggregates so called motor bearings are used. These motor bearings serve for decoupling vibrations introduced by the aggregate and for absorbing forces and torques generated during driving operation. The motor bearings are fastenable on corresponding bearing connection points of the subframe. Such a subframe for a motor vehicle is for example described in DE 198 22 731 A1.

Depending on the type of the aggregate and dimension, the demands on the motor bearings differ, which is why the size and the position of the motor bearings on the subframe always vary.

A high variance of subframes or cast joints for receiving different aggregates and motor bearings is however not feasible for economic and technical reasons.

EP 1 837 268 therefore proposes a subframe, which can be extended by an adapter part, which provides at least one additional bearing site. The adapter part is formed integrally on the stiffening structure. Thus at least two further bearing sites can be provided in addition to the bearing sites provided on the subframe. This allows also receiving drive aggregates of higher classes on the subframe. In the case of smaller engines a stiffened element is used which is formed without the adapter parts. Preferably the adapter part is hereby formed as transverse member.

A disadvantage is that depending on the equipment and type of engine being used, cross struts or a stiffening element have to be provided which leads to the fact that a relatively large component has to be manufactured in multiple variants thus foregoing the advantage of high volume production.

A further significant disadvantage is that even though the proposed solution provides a certain modularity, the bearing position always remains unchanged. In contrast to an eight or twelve-cylinder V-engine, identically positioned connection points cannot be used for a four-cylinder inline engine. EP 1 837 268 merely proposes a further bearing position in addition to the structurally identical bearings, which are formed in the cast console. However these spaces can no longer be used due to the direction of extent of different aggregates.

It would therefore be desirable and advantageous to further develop a subframe for a motor vehicle while avoiding the mentioned disadvantages, so that the bearing position of the engine bearings on the cast joints can be varied while retaining the essential, components of the subframe.

SUMMARY OF THE INVENTION

According to one aspect of the present invention, a subframe for a motor vehicle includes at least one transverse structure oriented in a transverse direction of the vehicle; a first and a second longitudinal member oriented in a longitudinal direction of the vehicle and connected to the at least one transverse structure by respective first and second cast joints respectively arranged between the first longitudinal member and the at least one transverse structure and the second longitudinal member and the at least one transverse structure, said first and second cast joints each having bearing connection points for fastening an engine bearing; and connection parts, one of said connection parts provided for each of the first and second cast joints, said connection parts each having at least one other bearing connection point for fastening the engine bearing, and multiple bearing sites via which the connection parts are fastenable on the at least one transverse structure and on the bearing connection points of the first and second cast joints.

The connection parts provided according to the invention now advantageously enable varying the bearing position of the engine bearings in the longitudinal, transverse and/or vertical direction (x- y- and/or z-direction) of the vehicle by correspondingly configuring the connection parts in particular by a corresponding positioning of the bearing connection points on the connection parts.

Thus, different mounting positions or a displacement of the engine bearing within subframes of identical construction are now possible. It is now also possible to install different engine bearings which each have different respective geometries. It is no longer necessary to adapt the cast joints, but rather a geometry or topology of the connection parts.

According to a particularly advantageous embodiment of the invention, a transverse beam and a shear field are provided on the subframe as transverse structure and the two connection parts each have two bearing sites on the transverse structure. While on the side of the cast joints the two connection parts are fastened on the cast joints via the bearing connection points present on the cast joints as was the case before, the two connection parts are fastened on the transverse structure via their bearing sites on both transverse structures, i.e., on the transverse beam and on the shear field. This configuration is particularly advantageous because it causes an additional stiffening of the subframe in x- y- and z-direction, which significantly improves the acoustic in the vehicle.

According to another advantageous feature of the invention, the two bearing sites on the transverse structure can be arranged and the connection parts configured so that a free corridor forms in the transverse direction of the vehicle (y-direction). This configuration of the transverse beams has the positive effect that sufficient mounting space for the arrangement for example of a stabilizer is provided.

According to a particularly simple embodiment the bearing sites on the transverse structure are arranged spaced apart viewed in longitudinal direction (x-direction) of the vehicle and the connection parts are configured bridge-like so as to form a free corridor when viewed in transverse direction (y-direction) of the vehicle.

According to another advantageous feature of the invention, the connection parts can be connected with the cast joints and the transverse structure by means of threaded connections. This ensures a fast and cost-effective mounting of the connection parts.

According to another advantageous feature of the invention, the connection parts can be configured as cast parts. The configuration of the connection parts as cast parts advantageously enables cost-effective production of the connection parts.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
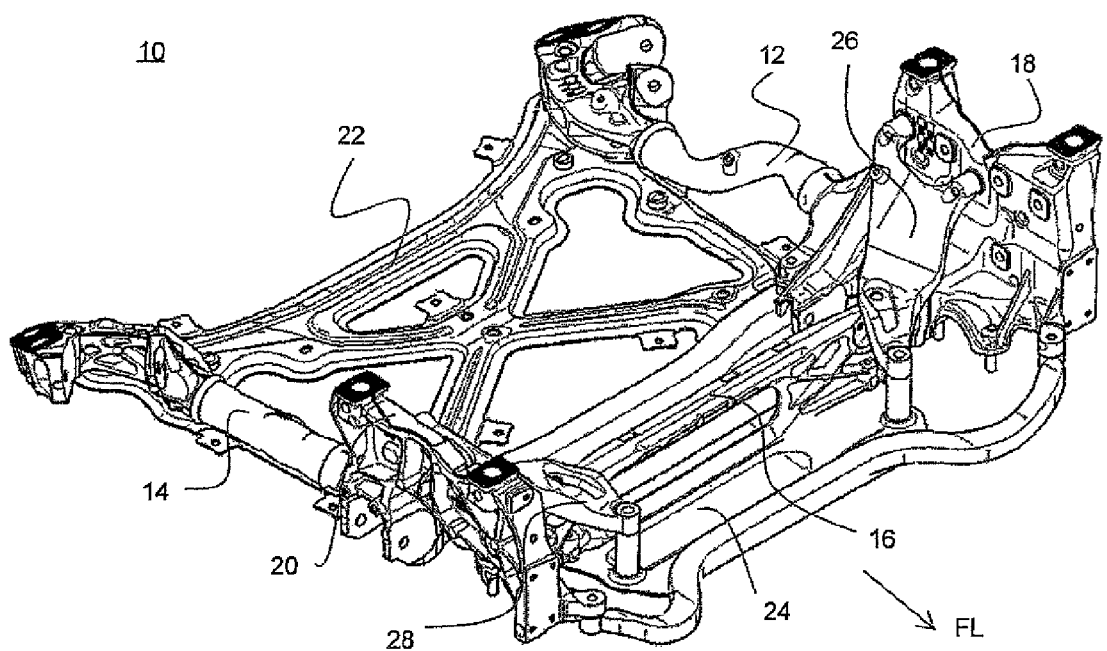
FIG. 1 shows a subframe according to the invention in a view obliquely from the front.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
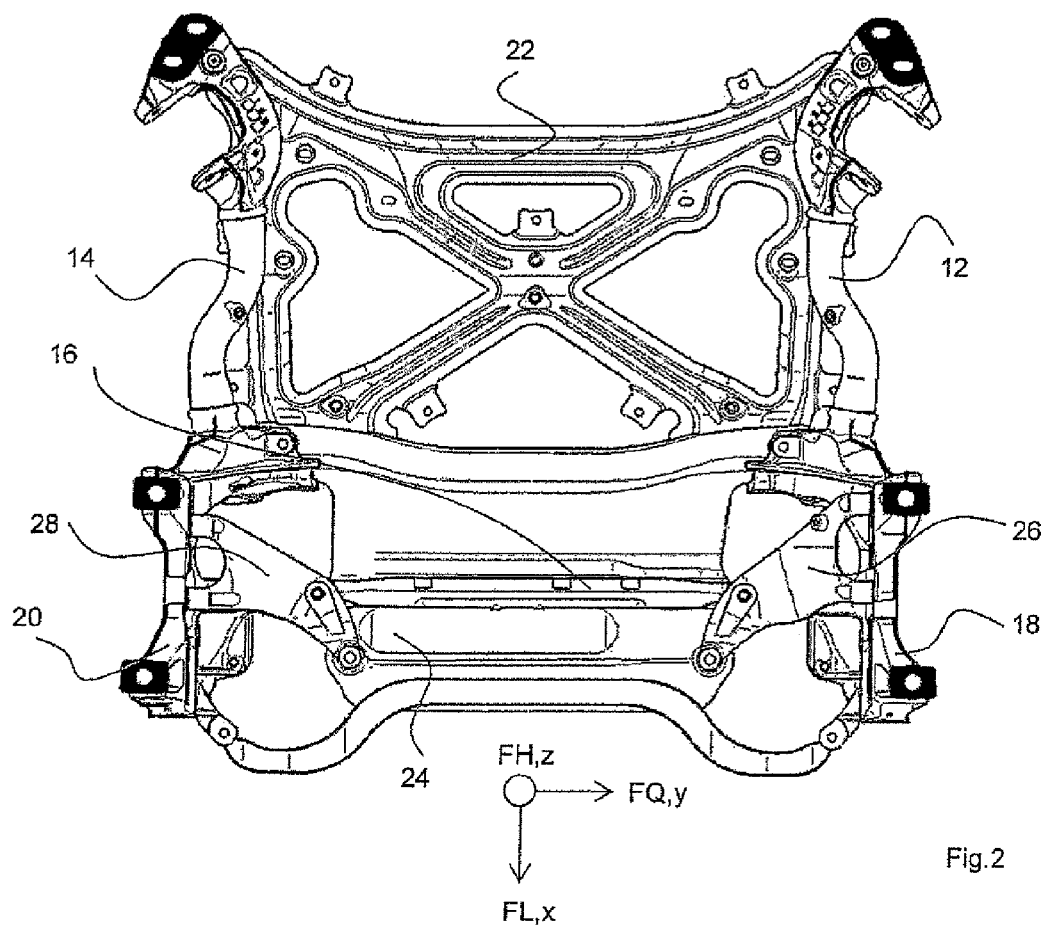
FIG. 2 shows the subframe of FIG. 1 in a top view.

Turning now to the drawing, FIGS. 1 and 2 show a subframe for a motor vehicle overall designated with the reference numeral 10.

The subframe 10 includes substantially a first longitudinal member 12 oriented in longitudinal direction FL of the vehicle, a second longitudinal member 14 oriented in longitudinal direction FL of the vehicle and a transverse member 16 extending in transverse direction FQ of the vehicle.

The two longitudinal members 12, 14 and the transverse member 16 are securely fastened to each other via a first and a second cast joint 18, 20. Beside the transverse member 16 the subframe 10 has as further transverse structure, a stiffening structure 22 and a shear field 24.

Figure 3:
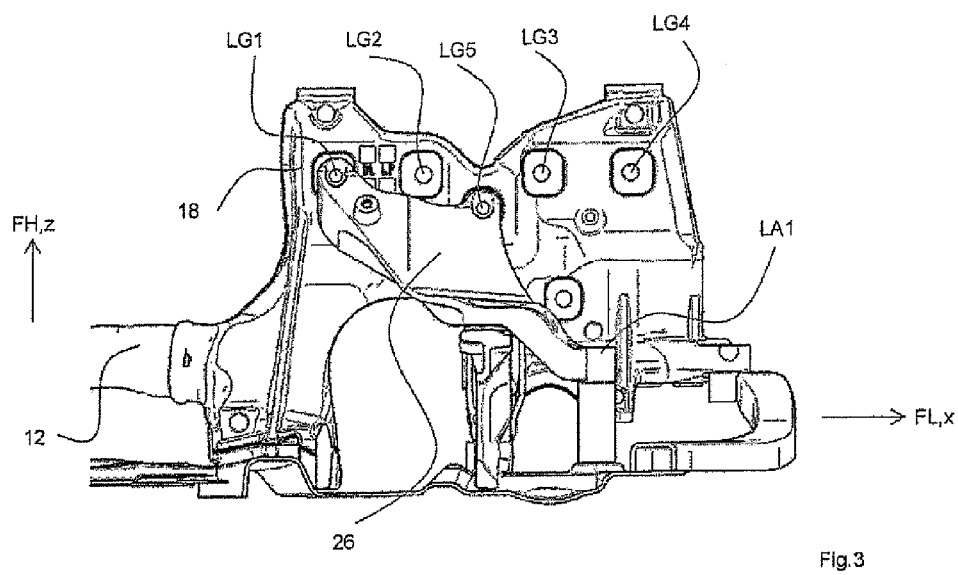
FIG. 3 shows an enlarged section of the subframe of FIGS. 1 and 2.

For receiving a drive aggregate which for reasons of simplicity is not shown in FIG. 1, multiple bearing connection points LG1, LG2, LG3, LG4 and LG5 are arranged for fastening an engine bearing, see in particular FIG. 3.

Further—as can be seen from FIGS. 1 and 2—a connection part 26, 28 is assigned to the cast joints 18, 20. As in particular shown in FIG. 3 each connection part 26, 28 has at least one bearing connection point LA1 for supporting an engine bearing.

On the side of the cast joints the connection parts 26, 28 are each connected with the assigned cast joints 18, 20 by utilizing at least one of the bearing connection points LG1, LG2, LG3, LG4 or LG5 present on the corresponding cast joints 18, 20. On the transverse structure each connection part 26, 28 is connected via two screw connections, i.e., on one side on the transverse member 16 and on the other side in the shear field 24. The described fastening of the two connection parts 26, 28 on the cast joints and transverse structure achieves an additional stiffening of the subframe 10 in all effective directions x, y and z, which significantly improves the acoustic in the vehicle.

The effect of the connection parts 26, 28 according to the invention is that depending on the chosen mounting position and configuration of the connection parts 26, 28 the position of the engine bearings within the otherwise same configured subframe 10 can be varied in a simple manner in x- y- and/or z-direction. A further effect is that different engines, which for example have different geometries, can be mounted on the subframe without requiring extensive cost-intensive changes. For this it is merely necessary to correspondingly configure the fast and cost-effectively producible connection part 26, 28—an adjustment of the cast joints 18, 20 is no longer required.

Figure 4:
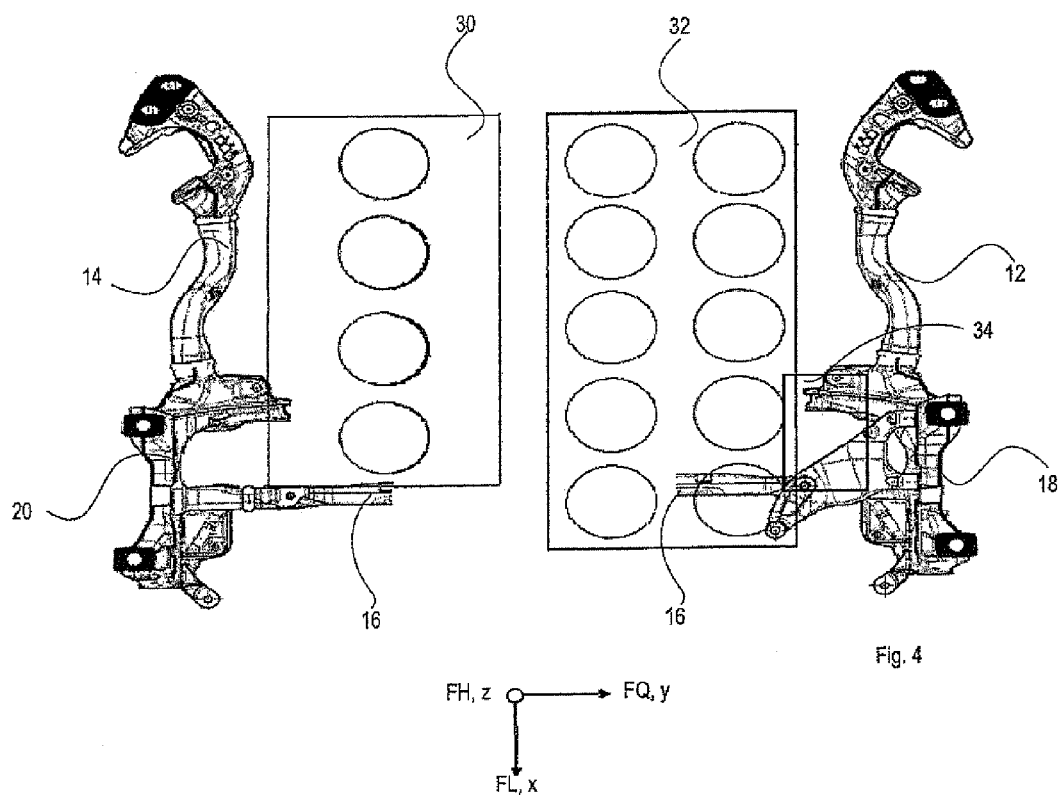
FIG. 4 shows the subframe of FIGS. 1 and 2 with two different drive aggregates.

The effect of this variability is shown in FIG. 4: While in the left image the left hand side of the subframe is shown with a small drive aggregate, the right representation shows the right hand side of the subframe with a large drive aggregate.

Hereby—as can be seen from FIG. 4—the left side and the right side of the subframe 10 are each configured identical.

In the left hand representation the subframe 10 is shown with a small longitudinally mounted drive aggregate 30, for example an inline four cylinder engine, R4. The drive aggregate is supported via an engine bearing which is directly mounted on the cast joints 20 without using a connection part.

In contrast on the right side, the subframe 10 with identical construction is shown which however receives a large longitudinally mounted drive aggregate 32, for example a V-12 engine. In addition to the drive aggregate 32 an aggregate component 34, for example an exhaust turbo charger, is shown. Because due to the direction of extent of the significantly larger drive aggregate 32 the mounting position of the engine bearing is occupied/covered for the smaller R4-engine, the attachment part 26 is arranged on the cast joints 18 by means of which attachment part 26 the mounting position of the required V-12 engine bearing can be displaced in x- y- and z-direction.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A subframe for a motor vehicle, comprising:
   at least one transverse structure oriented in a transverse direction of the vehicle;
   a first and a second longitudinal member oriented in a longitudinal direction of the vehicle and connected to the at least one transverse structure by respective first and second cast joints respectively arranged between the first longitudinal member and the at least one transverse structure and the second longitudinal member and the at least one transverse structure, said first and second cast joints each having bearing connection points for fastening an engine bearing; and separate connection parts, one of said connection parts provided for each of the first and second cast joints, said connection parts each having at least one other bearing connection point for fastening the engine bearing, and multiple bearing sites via which the connection parts are fastenable on the at least one transverse structure and on the bearing connection points of the first and second cast joints, said connection parts being spaced apart in vertical direction from the at least one transverse structure so that a passage is formed between the at least one transverse structure and each of the connection parts.

2. The subframe of claim 1, wherein the at least one transverse structure comprises a transverse member and a shear field, and the connection parts each have two said bearing sites on a side facing the at least one transverse structure, said connection parts being fastened with the transverse member and the shear field via the bearing sites.

3. The subframe of claim 2, wherein the two bearing sites are arranged and the connection parts are configured so that a free corridor is formed in the transverse direction of the motor vehicle.

4. The subframe of claim 1, wherein the connection parts are connected with the cast joints and the transverse structure by means of threaded connections.

5. The subframe of claim 1, wherein the connection parts are configured as cast parts.

* * * * *